June 4, 1946.  E. M. DAVIDS  2,401,554
SEWER PIPE JOINT
Filed June 26, 1943

INVENTOR.
ERNEST M. DAVIDS,
BY Hazard & Miller
ATTORNEY.

Patented June 4, 1946

2,401,554

UNITED STATES PATENT OFFICE 2,401,554

SEWER PIPE JOINT

Ernest Mark Davids, Los Angeles, Calif., assignor to Gladding, McBean & Co., Los Angeles, Calif., a corporation of California Application June 26, 1943, Serial No. 492,367

2 Claims. (Cl. 285—115)

This invention relates to a pipe joint and is particularly designed for use in effecting joints between adjacent sections of sewer pipe.

The conventional sewer pipe is formed of a ceramic material wherein the sections of pipe have at one end a spigot and at the other end a bell adapted to receive the spigot of the adjoining section. In the commercial production of sewer pipe the sections are not always uniformly made. Variations will occur depending upon the location of the pipe in the kiln at the time of firing and other irregularities will be present for numerous other reasons. It is desirable, however, to effect a tight joint between the bell and spigot which would effectively prevent penetration by roots. It is also desirable to effect such joint in such a manner that some flexibility is present to take care of the settling of the sewer pipe after it has been installed. Heretofore rubber sealing elements or gaskets have been employed which substantially fill the space between the exterior of the spigot and the interior of the bell. These rubber sealing elements while they produce a reasonably tight joint and permit of some flexibility and also allow for the irregularities in the pipe occasioned by its construction are relatively expensive due to the volume of rubber required.

A primary object of the present invention is to provide an improved joint which will allow for the irregularities in the pipe occasioned by its construction which will be tight and resist the penetration of roots, and which at the same time requires only a very small fraction of the amount of rubber that has heretofore been used in the sealing elements.

Another object of the invention resides in the method of constructing the joint to accomplish the above-mentioned desiderata.

Figure 1:
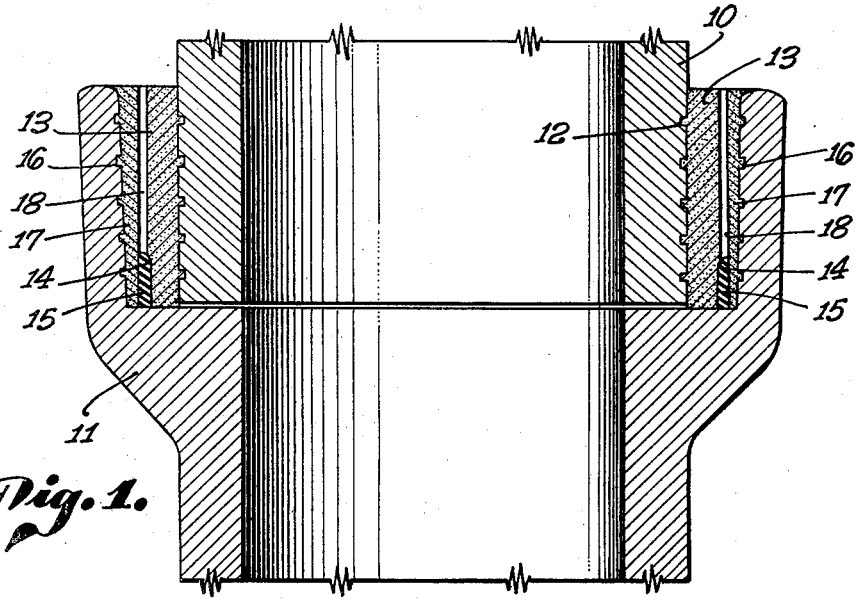
Figure 2:
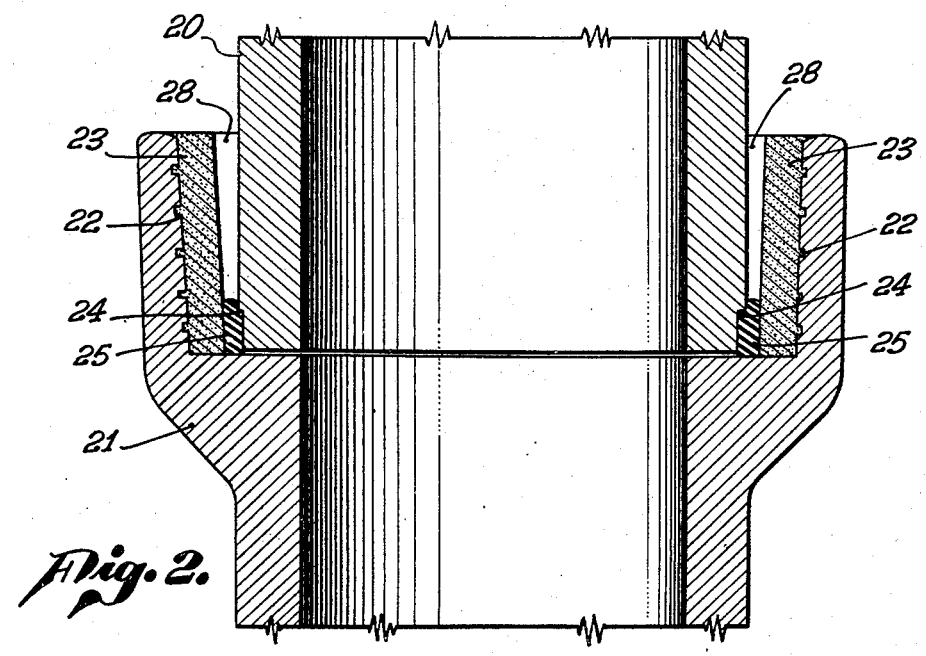

With the foregoing and other objects in view, which will be made manifest in the following detailed description and specifically pointed out in the appended claims, reference is had to the accompanying drawing for an illustrative embodiment of the invention, wherein:

Figure 1 is a longitudinal section through one form of pipe joint embodying my invention; and Fig. 2 is a longitudinal section through an alternative form of pipe joint embodying my invention.

Referring to the accompanying drawing wherein similar reference characters designate similar parts throughout, 10 designates the spigot end of a section of conventional sewer pipe which is usually formed of a ceramic material. 11 indicates the bell end of an adjoining section of sewer pipe that is intended to receive the spigot end 10.

In carrying out my invention I preferably roughen or groove the exterior of the spigot as at 12 to facilitate the anchoring thereto of a surrounding layer of self-hardening composition 13 which may be any conventional self-hardening joint compound, such as sulphur and silica.

It is not necessary to groove the spigot 12 in all instances as sometimes the exterior of the pipe as naturally formed in conventional practice, is sufficiently rough to adequately anchor or fasten the surrounding layer of material 13 thereto.

The bushing 13 is applied by inserting the spigot in a machined cylindrical steel mold and filling the mold with the compound or self-hardening material 13 which, when it hardens, forms a surrounding bushing on the cylindrical end of the spigot the exterior surface of which is accurately and cylindrically formed. Thus, even though the spigot end 10 may be highly irregular in shape due to firing or otherwise, by molding or casting the layer 13 thereabout these inequalities are effectively taken up.

The mold preferably provides a slight shoulder 14 adjacent the end of the surrounding bushing 13 against which can be positioned a small narrow rubber band 15.

In the form shown in Fig. 1, the interior of the bell 11 is similarly grooved or roughened as indicated at 16, and a substantially cylindrical steel core is positioned in the bell so as to cooperate with its interior surface to form a mold within which joint compounding or other self-hardening composition may be molded indicated at 17. It will be noted that there is a clearance 18 between the exterior of the band 13 on the spigot 10 and the interior of the lining 17 on the interior of the bell. This clearance permits of a limited amount of disalignment of the adjoining sections of sewer pipe which may be occasioned by the settling of the pipe.

The interior surface of the lining 17 is not perfectly cylindrical but preferably has a slight taper. In assembling the adjoining sections of sewer pipe constructed as above described, the spigot end with its attached bushing 13 and applied rubber band 15 is forced into the bell 11 with its lining 17. Due to the slight taper the rubber band is highly compressed about the bushing 13 and under compression the rubber becomes very hard and stiff so that it will not only serve effectively as a gasket to prevent leakage but will effectively prevent roots penetrating the joint.

It will thus be appreciated that the improved joint enables the use of commercial sewer pipe sections which may be irregular and non-uniform. The spigot and bell ends of the sections are rendered uniform by molding thereon the bushing 13 and the lining 17. Instead of filling the space between the spigot 10 and the interior of the bell with a rubber sealing element utilizing a large volume of rubber, only a thin, small inexpensive band of rubber need be employed. This rubber is advantageously located in the joint and is kept from slipping outwardly on bushing 13 during the insertion of the spigot by the shoulder 14. When assembled the rubber band is in a highly compressed condition. In the event that the pipe settles or the sections are otherwise disaligned such disaligning movement is permissible by means of the clearance 18 without loosening the joint or rendering it subject to penetration by roots.

In the form illustrated in Fig. 2, the bell 21 is preferably internally grooved as at 22 and lined with self-hardening material 23, the interior of which has a slight taper. In this form of construction, instead of molding or casting a bushing 13 around the spigot end 20 of the adjoining section of pipe the spigot end 20 is recessed and shouldered as at 24 adjacent its end to accommodate the rubber band 25.

This type of construction may be advantageously employed where the spigot ends of the sewer pipe can be constructed in a substantially uniform manner. Usually the recessed end and shoulder 24 are formed on the sewer pipe as it is originally molded. In assembling this joint the spigot end is merely thrust into the lining 23 in the bell with the result that due to the slight taper on the interior of the lining the small rubber band is highly compressed and rendered very stiff and hard because of the compression. In this form also the clearance space 26 between the exterior of the spigot and the interior of the lining accommodates or permits of slight disaligning of the adjoining sections.

From the above-described construction it will be appreciated that a new sewer pipe joint and method of making the same have been developed which enables the use of commercially produced sewer pipe which may have inequalities or irregularities. It consists of rendering either one or both ends of the sewer pipe sections uniform by applying thereto a surface layer of self-hardening material, provision being made for fitting on the spigot end of the pipe a small narrow rubber band which on being inserted into the slightly tapered lining on the bell will be highly compressed.

Various changes may be made in the details of construction without departing from the spirit or scope of the invention as defined by the appended claims.

I claim:

1. A sewer pipe joint having a bell and spigot, the bell having a lining molded therein presenting on its interior a smooth, uniform surface of revolution, the spigot having on its exterior a shoulder adjacent one end, and a rubber band positioned on the spigot against the shoulder and extending therefrom to the end of the spigot adapted to be carried thereby into the lining on the bell in assembling the joint.

2. A sewer pipe joint having a bell and spigot, the bell being lined with a molded material and presenting on its interior a smooth, uniform surface of revolution, the spigot having a molded bushing on its exterior presenting a smooth, uniform external surface of revolution, said bushing presenting a shoulder adjacent one end, a rubber band positioned against said shoulder and adapted to be carried thereby into the lining into the bell on assembling the joint.

ERNEST MARK DAVIDS.